(12) United States Patent
Han

(10) Patent No.: US 8,976,127 B2
(45) Date of Patent: Mar. 10, 2015

(54) MULTI-POINT TOUCH SCREEN OPERATING TOOL

(76) Inventor: Dingnan Han, Beijing (CN)

( * ) Notice: Subject to any disclaimer, the term of this patent is extended or adjusted under 35 U.S.C. 154(b) by 692 days.

(21) Appl. No.: 13/202,574

(22) PCT Filed: Feb. 10, 2010

(86) PCT No.: PCT/CN2010/070617
§ 371 (c)(1),
(2), (4) Date: Aug. 20, 2011

(87) PCT Pub. No.: WO2010/097031
PCT Pub. Date: Sep. 2, 2010

(65) Prior Publication Data
US 2011/0298742 A1    Dec. 8, 2011

(30) Foreign Application Priority Data
Feb. 25, 2009   (CN) .......................... 2009 1 0009227

(51) Int. Cl.
*G06F 3/041* (2006.01)
*G06F 3/0354* (2013.01)
*G06F 3/0488* (2013.01)

(52) U.S. Cl.
CPC .......... *G06F 3/03545* (2013.01); *G06F 3/0488* (2013.01)
USPC .......................... 345/173; 345/179; 178/18.01

(58) Field of Classification Search
CPC .... G06F 3/0488; G06F 3/04883; G06F 3/044
USPC ...................... 345/173–179; 178/18.01–18.04
See application file for complete search history.

(56) References Cited

U.S. PATENT DOCUMENTS

| | | | |
|---|---|---|---|
| 5,914,708 A * | 6/1999 | LaGrange et al. | 345/179 |
| 6,556,190 B2 * | 4/2003 | Fleck et al. | 345/179 |
| 7,649,524 B2 * | 1/2010 | Haim et al. | 345/173 |
| 2004/0041798 A1 * | 3/2004 | Kim | 345/179 |

* cited by examiner

*Primary Examiner* — Kimnhung Nguyen

(57) ABSTRACT

A method for determining a touch point during a special touch object contacting with a touch screen, and a touch screen operating tool, in particular a touch pen. The method includes: installing a sensor on the special touch object, comparing the data of the special touch object obtained by the sensor with the corresponding data of the contact point on the screen, determining the corresponding touch point of the special touch object.

16 Claims, 1 Drawing Sheet

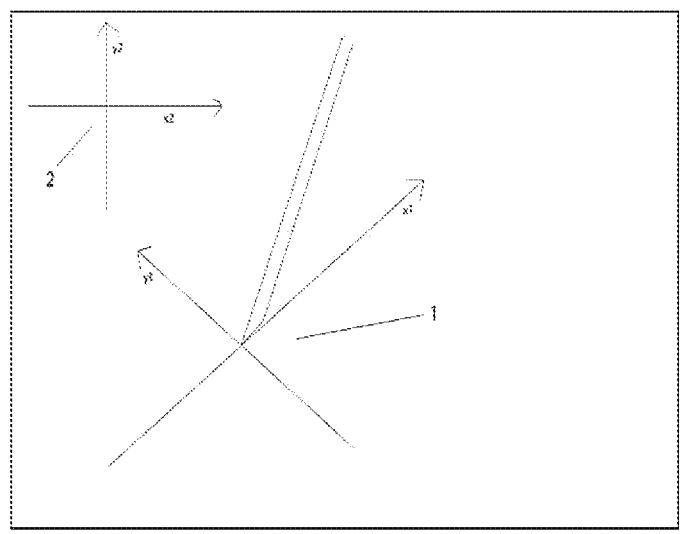

MULTI-POINT TOUCH SCREEN OPERATING TOOL

TECHNICAL FIELD

The present invention discloses a touch screen operating tool and a method, especially a multi-point touch screen operating tool.

BACKGROUND ART

The multi-point touch screen supporting touch image output in touch area has emerged so far; however, the operating tool for the multi-point touch screen still depends mainly on fingers, with no other operating tools and ways being found concurrent with the fingers.

BENEFICIAL EFFECT

The touch screen operating tool can be used singly or in combination with fingers, thereby be capable of providing more operation functions instead of simple finger operation. The positions of the touch objects based on the invention are still determined depending on the multi-point touch screen, so that the invention is low in cost and has the advantage that the simultaneous operations on the touch screen can not disturb the normal operation of the multi-point touch screen, having excellent compatibility.

SUMMARY OF INVENTION

The present invention provides a method for distinguishing objects touch a multi-point touch screen so that a system distributes different functions to touch points generated by different touch objects. By installing a sensor, the system, according to signals sent by the sensor, obtains the features of the touch points corresponding to the touch objects, and determines the touch point corresponding to a particular object. The data which the system can obtains from the sensor comprises, but not limited to, moment that the particular object touches the touch screen system, movement speed, movement direction in relation to a built-in coordinate system of the sensor, acceleration and pressure that the touch object applies on the touch screen. When the particular object begins or ends the touch with the touch screen, the sensor should sends the signal to notify the system that the touch of the particular object with the touch screen begins or ends. It is not necessary for sensor to possess all the above functions, but one or a plurality of functions. The signal through which the touch sensor is communicated with the system can be sent in either a wired manner or a wireless manner, and may be a light signal, an electric signal, a magnetic signal or an acoustic signal. The sensor can adopt an elastic ball capable of rolling and determines the rolling situation of the elastic ball through a relevant structure, such as gear or grating to determine the movement situation of the particular object, and the relevant structure can include proper damping in order to guarantee outstanding operating feeling. Also, the sensor can determine the movement direction and the acceleration of the object through an acceleration sensing device.

The sensor can sense the movement in an optical manner, wherein the movement speed and direction can be determined through comparing the touch tools captured by an optical sensor with the image at the touched position on the touch screen at different time points.

The sensor can sense the occurrence of the touch by means of, but not limited to, a relevant elastic structure. When the touch occurs, it is possible that a circuit in the elastic structure is switched on owing to pressure and the signal is sent, or that the relevant circuits in the elastic structure generate electromotive force owing to movement based on the principal of electromagnetic induction and are controlled to send the signal. The elasticity of the elastic structure can be obtained by means of spring, electromagnetic principal or elastic material. Also, the sensor can sense the touch by means of piezoelectric effect, this is because piezoelectric material, which is pressurized, can generates electric potential, and the electric potential controls the relevant circuits to send the signal. The system receives the signal sent by the sensor and then determines that the touch object touches the system. The sensor can also determine the rotation of the particular object under the situation that the particular object-corresponding touch point on the touch screen does not move. And such rotation can be endowed with relevant functions by the system.

Also, the sensor can sense the occurrence of the touch by means of radio frequency devices, such as an electromagnetic field induction device and the like, in this case, the touch equipment is not only equipped with a receiver for receiving the signal sent by the sensor on the touch tool, but is also required to be equipped with a relevant device achieving mutual induction with the sensor on the touch tool.

BRIEF DESCRIPTION OF THE DRAWINGS

FIGURE is a schematic diagram of the relation between the built-in coordinate system of the sensor and the touch screen-based coordinate system in the pen-shaped touch object of the embodiment 1.

DETAILED DESCRIPTION OF THE EMBODIMENTS

Description is made below to the present invention with reference to the specific embodiments.

The specific embodiment is a pen-shaped touch pen based on the method, which is equipped, at the nib thereof, with a sensor capable of sending a radio signal to the system at the moment the nib comes into contact with the touch screen in order to report the occurrence of the touch to the system. The sensor can obtain the movement speed of the nib in relation to the touch screen and the movement direction of the nib in relation to the touch pen. The direction in which a user holds the pen-shaped touch object remains uncertain, so the sensor reports a movement direction within an uncertain coordinate system. Shown as FIG. 1, an included angle between a coordinate system 1 based on the touch pen and a coordinate system 2 based on the touch screen is uncertain. The sensor reports the movement direction based on the coordinate system 1.

When the nib of the touch pen comes into contact with the multi-point touch screen, the sensor starts working and sends the signal to the system, the system detects the new touch points appearing on the touch screen at this moment, if only one new touch point appears at this moment, this touch point is considered to be the touch point generated by the touch of the touch pen, the corresponding function is distributed to the touch point, and the tracking for this touch point is maintained. When no touch point appears, the signal is ignored.

When a plurality of new touch points appear at the moment the touch occurs, the system tracks these touch points in several touch screen scanning cycles later, determines the movement speeds and the accelerations of the touch points, compares the movement speeds and the accelerations of the new touch points with the movement speed and the acceleration of the nib, reported by the sensor, in relation to the touch screen, and determines the touch point with the closest speed and acceleration as the touch point generated by the fact that the touch pen touches the touch screen. The system can also identify and track the touched points corresponding to the touch tool based on the touch image, wherein the touch point image of the touch tool can be preset in the system, or can be captured in real time during the system tracks the touch points corresponding to the touch tool.

After the touch point corresponding to the touch pen is determined, the system tracks this touch point. Owing to different pen holding directions of people, the included angle between the coordinate system 1 adopted by the sensor and the coordinate system 2 adopted by the touch screen varies constantly. After the touch point corresponding to the touch pen is determined, the included angle of the coordinate system 1 at various moments in relation to the coordinate system 2 is determined by tracking the movement direction of the touch point and the movement direction, reported by the sensor, in relation to the built-in coordinate system of the sensor, and then comparing the two movement directions. When the particular object-corresponding touch point does not move and the included angle between the coordinate system 1 and the coordinate system 2 varies, the system determines that the touch pen is rotated, and the system can distribute relevant function to the rotation of the touch pen. For example, the rotation of the touch pen at a certain point deepens the ink mark of this point.

If the tracking for the touch point corresponding to the touch pen is lost, the touch point can be recaptured by matching the movement direction, the movement speed and the acceleration of the touch point on the touch screen, which is possibly corresponding to the touch pen, with the movement direction, the movement speed and the acceleration of the nib of the touch pen. After the touch point corresponding to the touch pen crosses other touch points, the touch point which derives from the crossing location is the possible touch point. The movement direction of the touch pen at this moment in relation to the touch screen can be obtained through the movement direction, reported by the sensor, in relation to the coordinate system 1 and through the included angle, obtained by the system at previous moment, between the coordinate system 1 and the coordinate system 2, however, this movement direction is an estimated value, therefore, the matching degree between the movement speed and the acceleration of the touch point on the touch screen and the movement speed and the acceleration reported by the sensor should be considered firstly when the touch point corresponding to the touch pen is determined, and when the touch point corresponding to the touch pen cannot be determined only by the speed and the acceleration, the method for comparing the movement directions is then adopted for determining the touch point. The matching degree of the shape of the touch point on the touch screen and the shape of the touch point generated by the touch pen at previous moment on the touch screen can also be used as the basis for determining the touch point corresponding to the touch pen, nonetheless, the accuracy thereof is also lower than that of the result on the basis of the movement speed and the acceleration, so similarly, this method should be adopted when the touch point corresponding to the touch pen cannot be determined only by the speed and the acceleration. In the event that all the methods above cannot re-determine the touch point corresponding to the touch pen, the system should give a notification indicating that the tracking for the touch point corresponding to the touch pen is lost. At this time, user can raise the touch pen and then touch the screen again to lead the system to recapture the touch points. In most case, user just need to keep the touch points, which derives from the crossing location, in different movement speed, i.e., one point is stopped but another one keeps moving, then the system can recapture the touch points. In this way, the touch points can be recaptured without needing the touch tool to leave the touch screen, which is necessary for image drawing or other operation. If the system possessing pressure sensing function, then the user can apply different pressures on the touch screen, without raising the pen to leave from the screen, to enable the system to recapture the touch points according to the pressures.

The nib of the touch pen can be made of elastic material, e.g. rubber. The contact surface of the elastic material-made nib with the touch screen increases as the pressure applied to the touch screen by the touch pen increases. By detecting the area through an image output by the touch screen, the system can calculate the pressure applied to the touch screen by the touch pen in accordance with relevant preset parameters regarding the weight of the elastic material adopted by the touch pen and the weight of the touch pen. The relation between the area of the touch point of the touch pen and the pressure applied by a user can also be obtained in such a manner that the user is guided by relevant software to implement system self-calibration, and the method is specifically characterized in that the user is prompted to apply different forces to the touch screen through the touch pen, and the system records the contact area between the touch point and the touch screen under the situation that the user applies different forces. The force the user applies can derive from pressing the touch pen onto the touch screen, or lifting the touch pen, i.e. reducing the pressure applied to the touch screen by the touch pen owing to own gravity. Also, conducting material can be filled in the nib made of elastic material, such as liquid or solid, so that the touch screen based on the electric field sensing can accurately measuring the pressure of the touch object.

In case of a plurality of objects based on the method, these objects are distinguished from each other according to the different signals adopted for the communication with the system. It shall be understood by the skilled in this art that the difference of the signals can be embodied in the difference of signal types, the difference of frequencies and many other aspects.

By adopting the method, different touch objects can be enabled to touch the touch screen synchronously or asynchronously, realize different functions. For example, when operating the touch screen by hand, user takes up the touch pen based on the method and use it writing, relevant ink marks with different thicknesses are generated on the touch trajectory of the touch pen according to different applied pressures, and simultaneously, the hand can move the paper, adjust the color or the pattern of the ink marks or set the software to endow the touch pen with other functions, such as paper cutting knife. Afterwards, takes up the touch object based on the method, which has the corresponding function of eraser, erasing the ink marks. Or set the function of the touch pen as eraser by the software, to accomplish the erasing function. The setting for the corresponding functions of the touch pen can also be completed by arranging relevant switches on the touch pen, and the touch pen sends relevant control signals to the system. The touch pen can be equipped with a switch to shut down the sensor if required.

The so-called pen shape means the object people can hold in a pen holding gesture.

Any coordinate system can be used as the coordinate system 1 and the coordinate system 2.

The present invention introduces, but not limited to, a plurality of methods for implementing relevant functions of the sensor.

The present invention takes, but not limited to, the pen-shaped touch object for example for description.

The invention claimed is:

1. A method for determining the touch point corresponding to a particular touch object, characterized in that touch data of the particular touch object obtained by a sensor is compared with the relevant touch data of touch points on touch surface so as to determine which touch point is corresponding to the particular object, the touch data does not include exact location of the particular object.

2. The method according to claim 1, the data the sensor can obtain comprises one or more than one of the following data:
   moment when the particular touch object has a certain distance with the touch screen;
   moment the particular object touch the screen;
   movement speed of the contact point between the particular object and the screen;
   movement direction of the contact point between the particular object and the touch screen in relation to a built-in coordinate system;
   pressure between the particular object and the screen;
   the acceleration of the contact point between the particular object and the touch screen;
   and rotation of the touch object.

3. The method according to claim 2, characterized in the moment when the particular touch object has a certain distance with the touch screen is the moment when the distance is zero.

4. A touch object, characterized in a sensor is installed, when there are two or more touch points, according to the following information obtained by the sensor, system can determine which touch point is from the touch object, the touch information does not include exact location of the particular object, the sensor can obtain comprises one or more of the following data:
   moment when the particular touch object has a certain distance with the touch screen;
   moment the particular object touch the screen;
   movement speed of the contact point between the particular object and the screen;
   movement direction of the contact point between the particular object and the touch screen in relation to a built-in coordinate system;
   pressure between the particular object and the screen;
   the acceleration of the contact point between the particular object and the touch screen;
   and rotation of the touch object.

5. The touch object according to claim 4, characterized in that the moment when the particular touch object has a certain distance with the screen is the moment when the distance is zero.

6. The touch object according to claim 5, characterized in that the touch point corresponding to the particular object is determined by comparing the data of the particular touch object obtained by the sensor with the relevant data of the touch points on the screen.

7. The touch object according to claim 4, characterized in that when the touch object is operating a touch screen simultaneously with other touch objects, the touch screen can generate the effect different from other touch objects.

8. The touch object according to claim 4, characterized in that the touch object is pen-shaped.

9. The touch object according to claim 4, characterized in that the touch point corresponding to the particular object is determined by comparing the data of the particular touch object obtained by the sensor with the relevant data of the touch points on the screen.

10. The touch object according to claim 4, characterized in that the sensor is equipped with an elastic ball capable of rolling, and determines the rolling situation of the elastic ball through a relevant structure, such as gear or grating to determine the movement situation of the particular object.

11. The touch object according to claim 4, characterized in that a key or a switch is arranged on the touch object, so a user can start up or shut down the sensor or switch to the touch object-corresponding function by means of the key or the switch.

12. The touch object according to claim 4, characterized in that the sensor sends the signal owing to being pressurized.

13. The touch object according to claim 12, characterized in that the touch point corresponding to the particular object is determined by comparing the data of the particular touch object obtained by the sensor with the relevant data of the touch points on the screen.

14. The touch object according to claim 13, characterized in that the touch object is pen-shaped.

15. The touch object according to claim 12, characterized in that the touch object is pen-shaped.

16. The touch object according to claim 12, characterized in that the sensor adopted detects the occurrence of the touch through the following structure:
   when the touch occurs, a circuit in an elastic structure of the sensor is switched on owing to pressure, the signal is sent, and the elasticity of the elastic structure can be obtained by means of spring or electromagnetic principal or elastic material;
   when the touch occurs, the relevant circuits in the elastic structure of the sensor generate electromotive force owing to movement based on the principal of electromagnetic induction and are controlled to send the signal, and the elasticity of the elastic structure can be obtained by means of spring or electromagnetic principal or elastic material;
   the occurrence of the touch applies pressure to piezoelectric material which generates electric potential, and the electric potential controls the relevant circuits to send the signal.

* * * * *